United States Patent [19]
Casella et al.

[11] 3,915,475
[45] Oct. 28, 1975

[54] VEHICLE SAFETY STEP

[76] Inventors: Walter Casella, 24731 Belgreen Place; William H. Hardie, 24922 Muirlands Blvd., both of El Toro, Calif. 92630

[22] Filed: Oct. 23, 1974

[21] Appl. No.: 517,183

[52] U.S. Cl. ............................... 280/166; 182/120
[51] Int. Cl.² ............................................. B60R 3/02
[58] Field of Search ............ 280/163, 166; 182/120; 248/210; 108/69, 90

[56] References Cited
UNITED STATES PATENTS
335,051    1/1886    Ayres................................ 182/120
2,175,572  10/1939   Ruhl.................................... 108/90
3,008,533  11/1961   Haberle............................. 280/166

*Primary Examiner*—Robert R. Song
*Attorney, Agent, or Firm*—Gausewitz, Carr & Rothenberg

[57] ABSTRACT

A safety extension is provided for the relatively small slidably retractable step of a vehicle, such as a motor home or recreation vehicle. A safety step of considerably increased size is readily and securely attached to the existing retractable step when the latter is extended, and is quickly removed for storage and travel. No tools are required.

2 Claims, 3 Drawing Figures

VEHICLE SAFETY STEP

BACKGROUND OF THE INVENTION

Various types of vehicles, recreation vehicles in particular, are provided with a step to facilitate entrance and exit to and from the interior of the vehicle. Because such step is necessarily close to the ground, it must be either removed or retracted during travel. Partly for this reason, the self-storing vehicle step is generally made of a small size.

A commonly employed self-storing recreational vehicle step embodies a tread fixed to a pair of side brackets that are slidably mounted for upward and inward retraction and storage beneath the vehicle, and outward and downward extension for use. The step is self-locking in both positions, but generally has a tread so small as to make the step difficult and dangerous to use.

Although various types of attachable and retractable steps and ladder arrangements have been devised, to applicant's knowledge there are no step extensions in the prior art that are readily and simply attached to and detached from an existing step. Accordingly, it is an object of the present invention to provide an extension for a vehicle step that may be simply and quickly secured in place or removed for storage.

SUMMARY OF THE INVENTION

In carrying out principles of the present invention in accordance with a preferred embodiment thereof, an enlarged area extension step is provided for a self-storing vehicle step of the type having a small tread fixed to and between a pair of tread support members that are retractably mounted for storage within or beneath the vehicle and extension from the vehicle. The extendable safety step is constructed and arranged to interfit with the tread and support members of the existing step and, by virtue of such interfit, the safety step is firmly positioned upon and securely retained in place upon the retractable tread.

DETAILED DESCRIPTION

Figure 1:
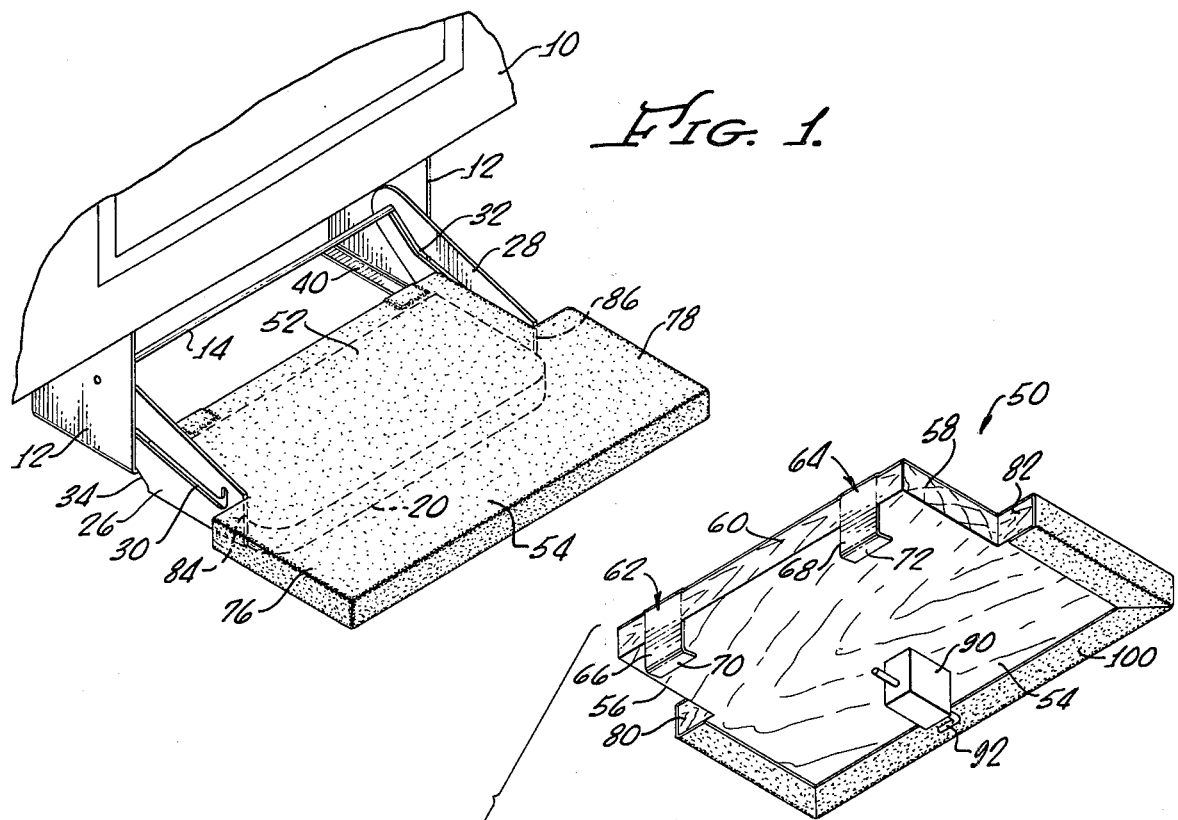
FIG. 1 is a perspective view of portions of a recreational vehicle showing an existing retractable step having the safety step extension of the present invention installed thereon.
Figure 2:
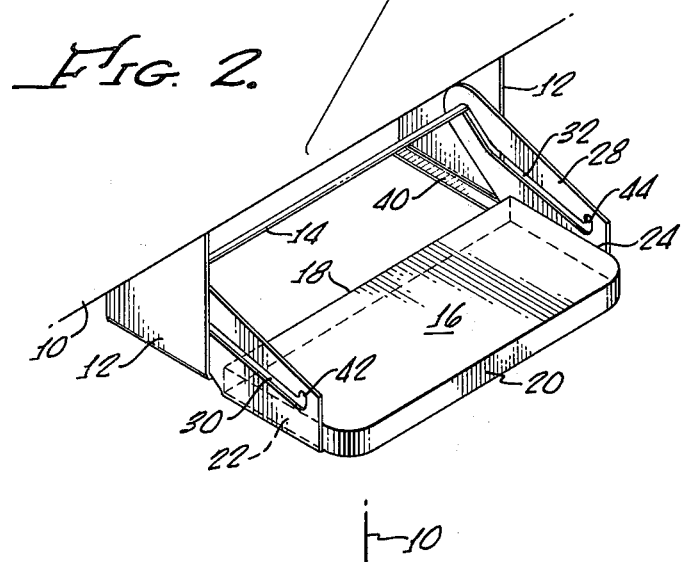
FIG. 2 is an exploded perspective view showing the extension safety step removed from the retractable tread, which is shown in extended position.
Figure 3:
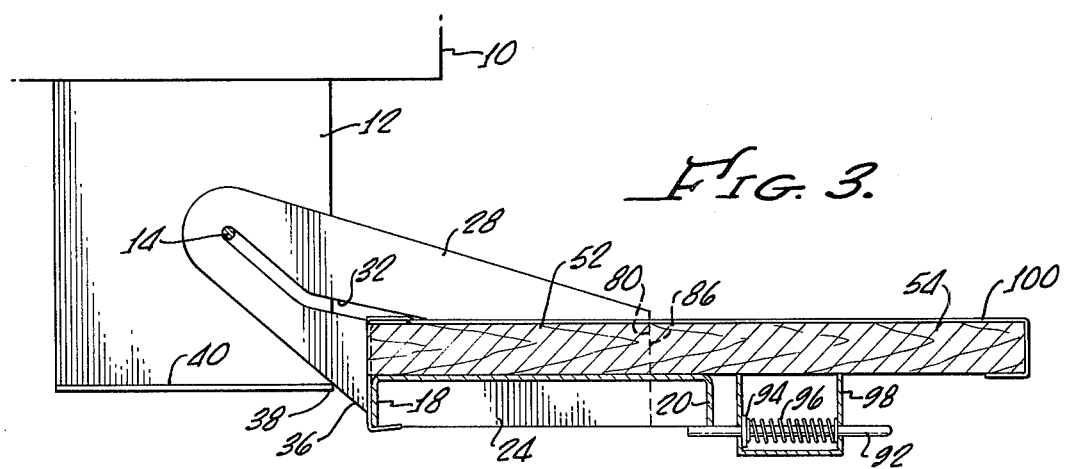
FIG. 3 is a sectional side view of the safety step mounted upon the tread.

A vehicle body 10, of which a portion is shown in FIG. 1, carries a fixed depending U-shaped step support frame 12 in which is fixed a rigid structural cross rod 14. A retractable step is mounted to the truck body 10 and support frame 12 for motion between a retracted and extended position. When in stored position (not shown), the step is within the U-shaped frame 12 and beneath the truck body 10. When in an extended position, illustrated in FIGS. 1, 2 and 3, the step extends downwardly and forwardly from the truck body.

The retractable step comprises a tread 16 in the form of a generally rectangular flat and rigid plate having depending back and front flanges 18, 20 and first and second side flanges 22, 24 which provide stiffening and reinforcement for the upper body portion of the tread. Fixedly attached to the respective side flanges 22, 24, as by welding, bolts or rivets or the like, are first and second tread support brackets 26, 28 having guide slots 30, 32, respectively, which slidably receive and guide the structural cross rod 14. The brackets 26, 28 each includes an upwardly inclined rearward portion having lower edges 34, 36, respectively, which rest upon the forward edge 38 (FIG. 3) of the horizontally extending bight 40 of the U-shaped step support frame 12. This contact between edge 38 and bracket section 36 cooperates with the structural rod 14 when the latter is positioned in the upper end of slots 30, 32 to hold the step in extended position. The step is stored by sliding the tread together with the brackets 26, 28 upwardly and rearwardly into the step support frame 12 until the rod 14 is received in an angulated end portion 42, 44 of the respective slots 30, 32.

Commonly, a step such as that described up to this point is made of a small size because of space limitations in its retracted, storage position. Although the step is conveniently stored and readily extendable, its small size makes use difficult and inconvenient and, in some cases, particularly for careless or infirm persons, the step is actually dangerous to use.

According to the present invention, an extension safety step 50 is provided to significantly extend the area of the tread 16 so as to make the extended tread 16 more convenient and safe to use either from the front or from the side. The safety step 50 is constructed and arranged to be firmly mounted to and to lie upon the extensible tread 16, and yet is simply and readily attached and detached without the use of any tools.

The safety step comprises a relatively flat rigid body having a rearward section 52 and an integral forward section 54, each of generally rectangular configuration. Rearward section 52 has a lateral dimension from one side 56 to the other side 58 thereof, that is substantially equal to the lateral dimension, or width, of tread 16, or more specifically, equal to the distance between the inwardly facing surfaces of the tread support brackets 26, 28. Thus, the rear section 52 is a snug, but not a tight fit between the brackets 26, 28.

Fixed to and depending from the rear edge 60 of rear section 52 are first and second L-shaped hooks 62, 64, each having a first leg 66, 68 that depends from the body section 52 and is integrally connected with an angulated forwardly extending leg 70, 72, respectively, that extends substantially parallel to the surface of the safety step. The horizontal legs 70, 72 are spaced from the undersurface of the safety step section 52 by a distance substantially equal to the thickness of the tread 16 or, more specifically, by a distance equal to the height of the back flange 18. Accordingly, the hooks may be snugly engaged over the back flange simply by tilting the safety step upwardly, inserting the rear section 52 downwardly into the space between the rear edge of tread 16 and the cross rod 14, and then lowering step 50.

Forward section 54 of the safety step has a lateral dimension significantly greater than the dimension between the tread support brackets 26, 28, and includes lateral extensions 76, 78 on either side of the safety step. Extensions 76, 78 define rearwardly facing stabilizing shoulders 80, 82 that are positioned to abut the forwardly facing edges 84, 86 of tread support brackets 26, 28, respectively. These shoulders stabilize the step extension or safety step 50 in operating position. The shoulders cooperate with the two opposite sides 56, 58 of the rear section 52 and with the hooks 62, 64, all of which combine to properly position and retain the safety step upon the tread 16. The stabilizing shoulders 80, 82 not only prevent rearward motion of the safety step relative to the tread, but also assist in maintaining appropriate orientation of the safety step, resisting twisting of the step in a relatively horizontal plane. It will be seen that the lateral extensions 76, 78 of the forward section 54 not only provide additional supporting surfaces at the sides of the apparatus, to greatly increase the useful area thereof, but also define the stabilizing shoulders 80, 82. Thus, the very configuration that increases the support area also helps to retain the apparatus in position. It will be seen that the underside of the flat safety step is in contact with and supported by the upper side of the flat tread plate throughout substantially the entire area of the tread plate to further enhance the firm support of the extended area of the safety step.

If deemed necessary or desirable, the safety step may be provided with means for detachably connecting the forward section 54 to the front edge 20 of the tread 16. To this end, a latch housing 90 is fixed to and depends from the underside of the safety step at its forward section 54 and slidably mounts a latch rod 92 (FIG. 3) which extends through the housing for engagement beneath the lower edge of the forward flange 20 of tread 16. A collar 94 is fixed to the rod 92 and a spring 96 is compressed and confined between collar 94 and a forward end 98 of the latch housing 90. An angulated forward end of the rod 92 serves as a handle to enable the rod to be retracted against the urging of the spring 96 for attachment and detachment from the tread flange 20.

If deemed necessary, a suitable covering, such as an outdoor carpeting or a non-skid plastic sheeting 100, may be secured to the safety step to cover the upper surface and all edges thereof.

It will be readily appreciated that the safety step may be constructed of different materials, such as wood, metal or plastic. It may be solid, as indicated, or of a sheet metal or plastic construction with reinforcing ribs and flanges.

As previously indicated, the described extension is readily attachable to the extended tread by tilting the safety step and inserting its rear section 52 downwardly past the rear edge 18 of tread 16, then downwardly tilting the safety step to engage the hooks 62, 64. If the safety step is provided with a latch to engage the forward edge of the tread 16, the latch rod 92 is retracted as the safety step is pivoted downwardly and then released to be driven forwardly by spring 96 and engage the lower edge of forward flange 20. Removal of the safety step is equally simple and convenient. If a forward latch is provided, the latch rod 92 is retracted and the safety step is merely tilted upwardly at its forward end and moved rearwardly to release the hooks 62, 64. The safety step is thus detached and may be readily stored in any convenient location and the retractable tread 16 may be slidably guided into its storage position beneath the vehicle.

Although the invention has been described for use with a retractable tread having fixed brackets, the rearwardly facing shoulders can readily be configured and positioned for step stabilizing contact with forward portions of other types of the retractable tread supports, such as hinged support members and various types of pivotable supporting linkages.

The foregoing detailed description is to be clearly understood as given by way of illustration and example only, the spirit and scope of this invention being limited solely by the appended claims.

What is claimed is:

1. A retractable step for a vehicle comprising
    a retractable tread including a flat and rigid plate having front and back edges and first and second sides,
    first and second tread support brackets fixed to respective tread sides and each extending upwardly and rearwardly from said tread, each said bracket including a forwardly facing end extending upwardly from a respective side of said tread,
    means for retractably mounting the brackets to a vehicle for motion from a storage position to an extended position,
    a readily connectable and detachable safety step for providing a significantly increased tread area, said safety step comprising a flat rigid step body lying atop said retractable tread between said first and second brackets and having first and second side edges juxtaposed to inwardly facing surfaces of said first and second brackets, respectively,
    hook means on said safety step body in engagement with said rear edge of said tread, said safety step including a forward section having a lateral dimension greater than the lateral distance between said first and second brackets and defining first and second rearwardly facing step stabilizing shoulders respectively abutting the forwardly facing ends of said first and second support brackets and cooperating with said hook means to retain and stabilize the safety step to and upon the tread and support brackets, said safety step including a rear section extending between said brackets and having a lateral dimension substantially equally to the distance between said brackets to form a snug fit between the brackets, the underside of said flat safety step being in contact with and supported by the upper side of said flat tread plate throughout substantially the entire area thereof.

2. In a self-storing vehicle step having a tread connected to and extending between first and second brackets fixed to the side edges of said tread and extending upwardly thereof for a substantial portion of the tread depth, said brackets each being mounted to a vehicle for movement between a storage position and an extended position, said tread having rear, front and side edges and a tread surface, and said brackets each having a forward portion positioned at respective sides of said tread, the improvement comprising a safety step adapted to be readily attached to and detached from said vehicle step, said safety step comprising
    a body portion having a dimension from front to back greater than the corresponding dimension of said tread and having a rear section and a forward section, said rear section having a smaller dimension from side to side than said forward section and positioned to lie upon said tread between said first and second support brackets, sides of said rear section abutting inner surfaces, respectively, of said upwardly extending portions of said brackets, said forward section having a side-to-side dimension considerably greater than the side-to-side dimension of said rear section, and cooperating therewith to form first and second rearwardly facing shoulders at respectively opposite sides of said forward section, said shoulders being positioned in abutting relation with said forwardly facing portions of said first and second brackets, respectively, means for securing a rear edge of said safety step to the rear of said tread comprising substantially L-shaped hook means having a first leg fixed to said safety step and depending therefrom and a second leg integral with said first leg and spaced from the undersurface of said safety step by a distance not less than the thickness of said tread, said second leg extending forwardly in a direction substantially parallel to the surface of said tread, and means for securing said forward sections of said safety step to the front edge of said tread, comprising a retractable locking member slidably mounted to the underside of said safety step and spaced therefrom by a distance substantially equal to the thickness of said tread, spring means for urging said locking member rearwardly, and a handle on said locking member for retracting the locking member against the force of said spring.

* * * * *